US010737387B2

(12) United States Patent
Du et al.

(10) Patent No.: US 10,737,387 B2
(45) Date of Patent: Aug. 11, 2020

(54) ROBOT ARM CALIBRATION DEVICE AND METHOD THEREOF

(71) Applicant: INDUSTRIAL TECHNOLOGY RESEARCH INSTITUTE, Chutung, Hsinchu (TW)

(72) Inventors: Yan-Yi Du, Kaohsiung (TW); Cheng-Chuan Chao, Taichung (TW); Shu Huang, Zhudong Township, Hsinchu County (TW); Hung-Hsiu Yu, Changhua (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 288 days.

(21) Appl. No.: 15/936,103

(22) Filed: Mar. 26, 2018

(65) Prior Publication Data
US 2019/0168385 A1 Jun. 6, 2019

(30) Foreign Application Priority Data

Dec. 5, 2017 (TW) .............................. 106142605 A
Dec. 29, 2017 (TW) .............................. 106146427 A (51) Int. Cl.
*B25J 9/16* (2006.01)
*B25J 9/00* (2006.01)

(52) U.S. Cl.
CPC ........... *B25J 9/1638* (2013.01); *B25J 9/0087* (2013.01); *B25J 9/1692* (2013.01); *B25J 9/1694* (2013.01); *Y10S 901/09* (2013.01); *Y10S 901/46* (2013.01)

(58) Field of Classification Search
CPC ...... B25J 9/1638; B25J 9/0087; B25J 9/1692; B25J 9/1694; B25J 9/0084; Y10S 901/09;
(Continued)

(56) References Cited

U.S. PATENT DOCUMENTS 6,321,137 B1 11/2001 De Smet
7,899,577 B2 3/2011 Ban et al.
(Continued)

FOREIGN PATENT DOCUMENTS

CN 102062587 A 5/2011
CN 102942061 A 2/2013
(Continued)

OTHER PUBLICATIONS

Abidi et al., Autonomous robotic inspection and manipulation using multisensor feedback, 1991, IEEE, p. 17-31 (Year: 1991).*
(Continued)

*Primary Examiner* — Mcdieunel Marc
(74) *Attorney, Agent, or Firm* — Muncy, Geissler, Olds & Lowe, P.C.

(57) ABSTRACT

A robot arm calibration device is provided, which includes a light emitter, a light sensing module, a cooperative motion controller and a processing module. The light emitter is disposed on at least one robot arm to emit a light beam. The light sensing module is disposed on at least another robot arm to receive the light beam and the light beam is converted into a plurality of image data. The cooperative motion controller is configured to drive the light emitter and light sensing module on at least two robot arms to a corrected position and a position to be corrected, respectively. The processing module receives the image data and the motion parameters of the at least two robot arms to calculate an error value between the corrected position and the position to be corrected, and analyzes the image data to output a corrected motion parameter for modifying motion command.

22 Claims, 8 Drawing Sheets (58) Field of Classification Search
CPC ......... Y10S 901/46; G06T 1/20; A61B 34/40; A61B 34/25; G06Q 10/87; G01B 21/042
See application file for complete search history.

(56) References Cited

U.S. PATENT DOCUMENTS

| | | | |
|---|---|---|---|
| 8,082,064 | B2 | 12/2011 | Kay |
| 8,120,301 | B2* | 2/2012 | Goldberg ............... A61B 34/30 318/432 |
| 8,290,618 | B2 | 10/2012 | Demopoulos |
| 8,423,182 | B2* | 4/2013 | Robinson ............... A61B 34/25 700/245 |
| 9,156,160 | B2* | 10/2015 | Nagai ..................... B25J 9/0084 |
| 9,310,482 | B2* | 4/2016 | Rosenberg ............ G01B 21/042 |
| 9,623,563 | B2* | 4/2017 | Nixon ..................... B25J 9/1692 |
| 10,192,195 | B1* | 1/2019 | Brazeau ............... G06Q 10/087 |
| 2009/0157226 | A1 | 6/2009 | De Smet |
| 2014/0277715 | A1* | 9/2014 | Nagai ..................... B25J 9/0084 700/248 |
| 2017/0210011 | A1 | 7/2017 | Hull |
| 2018/0285110 | A1* | 10/2018 | Ray ........................... G06T 1/20 |
| 2019/0206565 | A1* | 7/2019 | Shelton, IV ........... A61B 34/74 |
| 2019/0270306 | A1* | 9/2019 | Uroz Soria ............... B41J 2/07 |

FOREIGN PATENT DOCUMENTS

| | | |
|---|---|---|
| CN | 103889663 B | 9/2016 |
| CN | 106989670 A | 7/2017 |
| CN | 104602871 B | 8/2017 |
| TW | 201217123 A | 5/2012 |
| TW | I404609 B | 8/2013 |
| TW | 201603979 A | 2/2016 |
| TW | I537110 B | 6/2016 |
| TW | I561354 B | 12/2016 |
| TW | 201702034 A | 1/2017 |
| TW | 201509617 A | 3/2017 |
| TW | I579123 B | 4/2017 |

OTHER PUBLICATIONS

Yussof et al., Handling capabilities of two robot hands equipped with optical three-axis tactile sensor, 2009, IEEE, p. 165-170 (Year: 2009).*
Hsiao et al., External tracking of an instrument by electric fields in minimally invasive surgery, 2016, IEEE, pg. (Year: 2016).*
Basdogan et al., VR-Based Simulators for Training in Minimally Invasive Surgery, 2007, IEEE, p. 54-66 (Year: 2007).*
Tendick et al., Human-Machine Interfaces for Minimally Invasive Surgery, 1997, IEEE, p. 2771-2776 (Year: 1997).*
Jian Zhou et al, "Selecting Optimal Measurement Poses for Kinematic Calibration of Industrial Robots," Advances in Mechanical Engineering, May 20, 2014, pp. 1-9, vol. 2014, Article ID 291389, Republic of Korea.
Mohamed Abderrahim et al, "Accuracy and Calibration Issues of Industrial Manipulators," Industrial Robotics: Programming, Simulation and Application, Dec. 2006, pp. 131-147.
In-Won Park, et al "Laser-Based Kinematic Calibration of Robot Manipulator Using Differential Kinematics," ASME Transactions on Mechatronics, Dec. 2012, pp. 1059-1067, vol. 17, No. 6.
"Absolute Accuracy," User's guide BaseWare option, ABB Automation Technology Products AB, 2003, 40 pages.
Gianni Campion, et al "Robot Calibration using Mobile Camera" International Conference on Robotics & Automation, Washington, DC, May 2002. pp. 141.
In-Chul Ha, "Kinematic parameter calibration method for industrial robot manipulator using the relative position," Journal of Mechanical Science and Technology 22, 2008, pp. 1085-1090.

* cited by examiner

ROBOT ARM CALIBRATION DEVICE AND METHOD THEREOF

This application claims the benefit of Taiwan application Serial No. 106142605, filed Dec. 5, 2017 and the benefit of Taiwan application Serial No. 106146427, filed Dec. 29, 2017, the subject matters of which are incorporated herein by reference.

TECHNICAL FIELD

The disclosure relates in general to a robot arm, and more particularly to a robot arm calibration device and a calibration method thereof.

BACKGROUND

In general, in order to achieve high level of absolute precision, the robot arms must be passed through various checks and adjustments in the manufacturing process before shipment. However, the precision of robot arm after long time of use is hard to maintain due to mechanical offset, or due to the deviation caused by maintenance of the robot arm (such as replacement of a motor or a gear set). Therefore, how to ensure the precision of the robot arm within the required range and directly calibrate the precision of the robot arm on the production line (in-line) is an urgent problem to be resolved for the industry.

SUMMARY

The disclosure is directed to a robot arm calibration device and a calibration method thereof capable of correcting the precision of the robot arm to be corrected by the corrected robot arm.

According to one embodiment, a robot arm calibration device is provided, which includes a light emitter, a light sensing module, a cooperative motion controller and a processing module. The light emitter is disposed on at least one robot arm to emit a light beam. The light sensing module is disposed on at least another robot arm to receive the light beam and the light beam is converted into a plurality of image data. The cooperative motion controller is configured to drive the light emitter and light sensing module on at least two robot arms to a corrected position and a position to be corrected, respectively. The processing module receives the image data and the motion parameters of the at least two robot arms to calculate an error value between the corrected position and the position to be corrected, and analyzes the image data to output a corrected motion parameter. The cooperative motion controller modifies a motion command of at least one of the at least two robot arms according to the corrected motion parameter.

According to another embodiment, a robot arm calibration method is provided, including the following steps. A light emitter and a light sensing module are disposed on at least two robot arms, respectively. The light emitter and the light sensing module on the at least two robot arms are respectively driven to a corrected position and a position to be corrected. The light emitter emits a light beam to project the light beam onto the light sensing module. The light sensing module receives the light beam and converts the light beam to a plurality of image data. According to the image data and the motion parameters of the at least two robot arms, an error value between the corrected position and the position to be corrected is calculated, and the image data is analyzed to output a corrected motion parameter. The motion command of at least one of the two robot arms is modified according to the corrected motion parameter.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements.

Figure 1A:
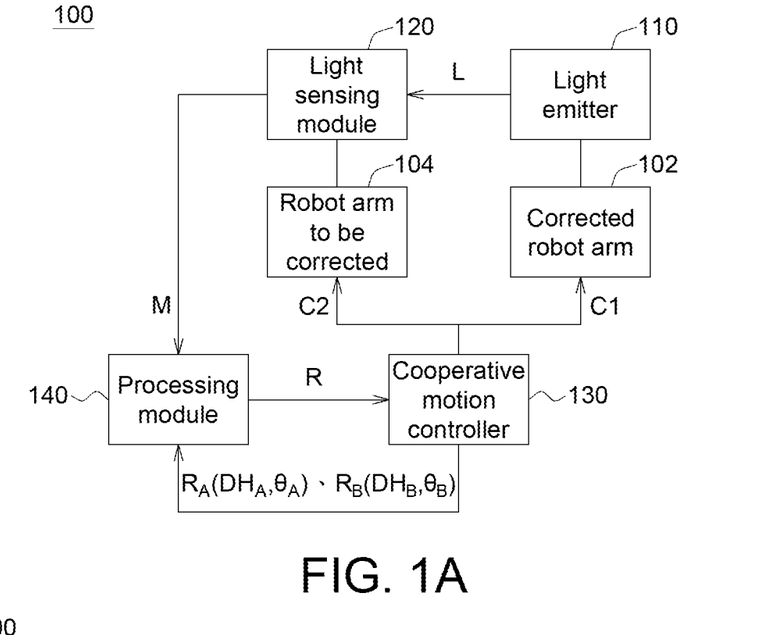
FIGS. 1A and 1B are schematic diagrams of a robot arm calibration device according to an embodiment of the disclosure.
Figure 1B:
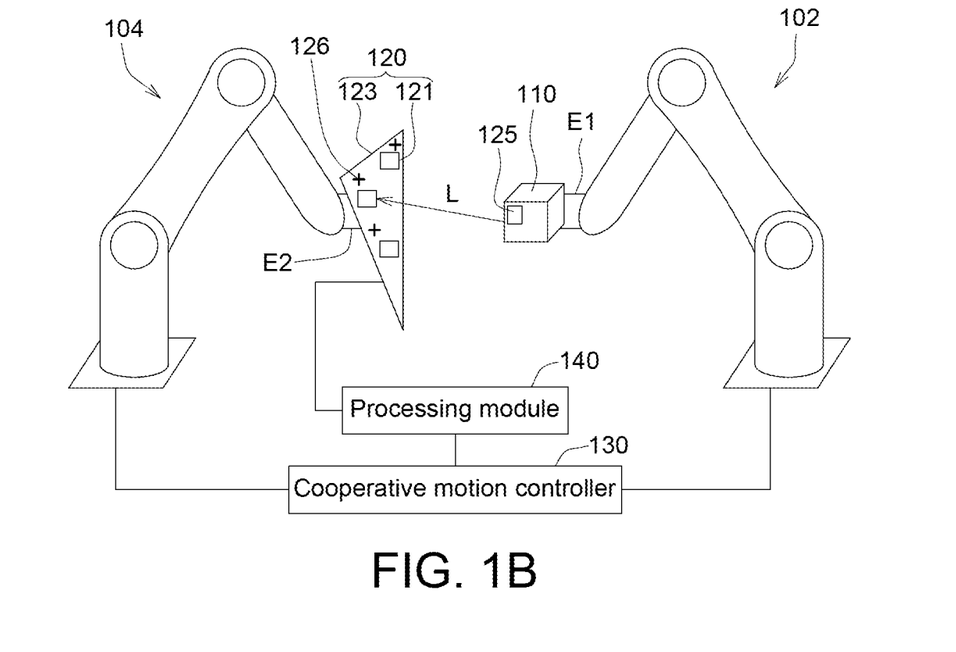
Figure 2:
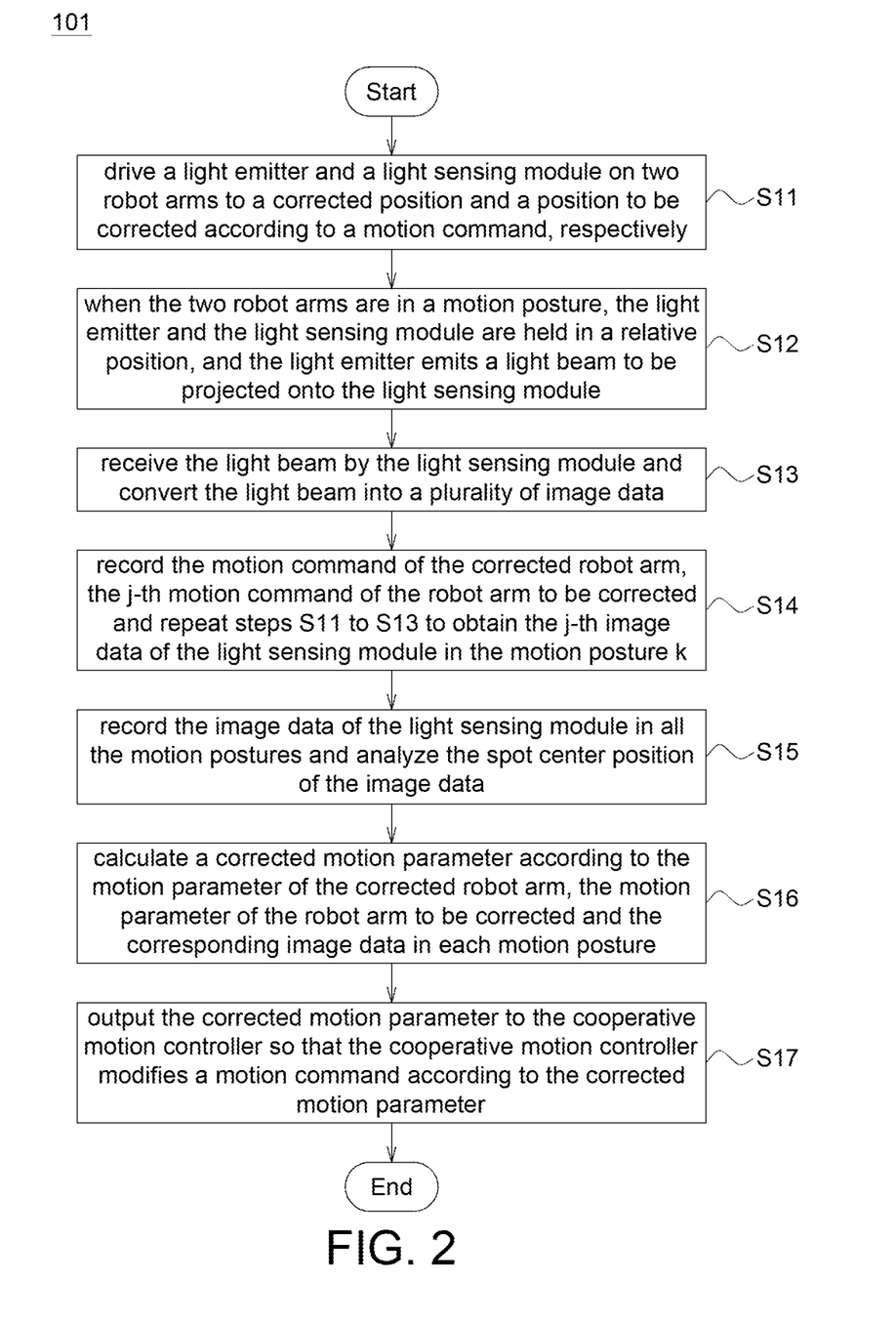
FIG. 2 shows a flow diagram of a robot arm calibration method according to an embodiment of the disclosure.
Figure 3A:
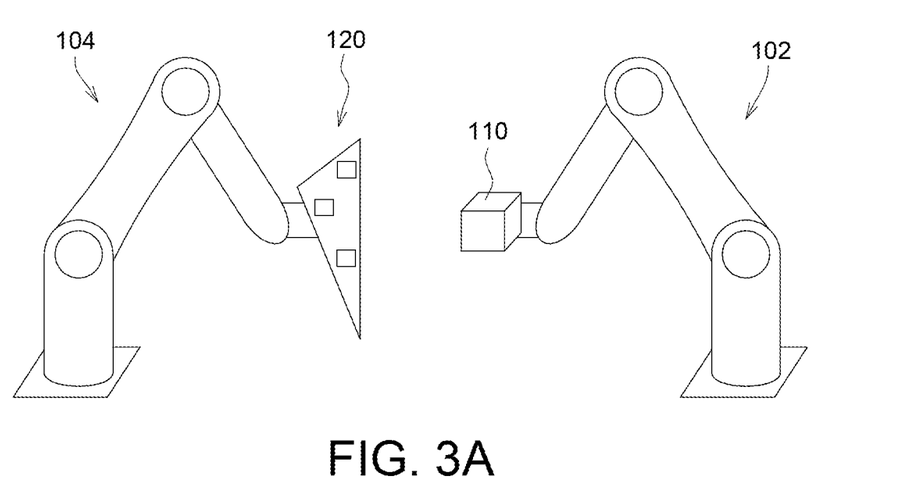
FIGS. 3A-3C show schematic diagrams of relative movements of two robot arms according to an embodiment of the disclosure, respectively.
Figure 3B:
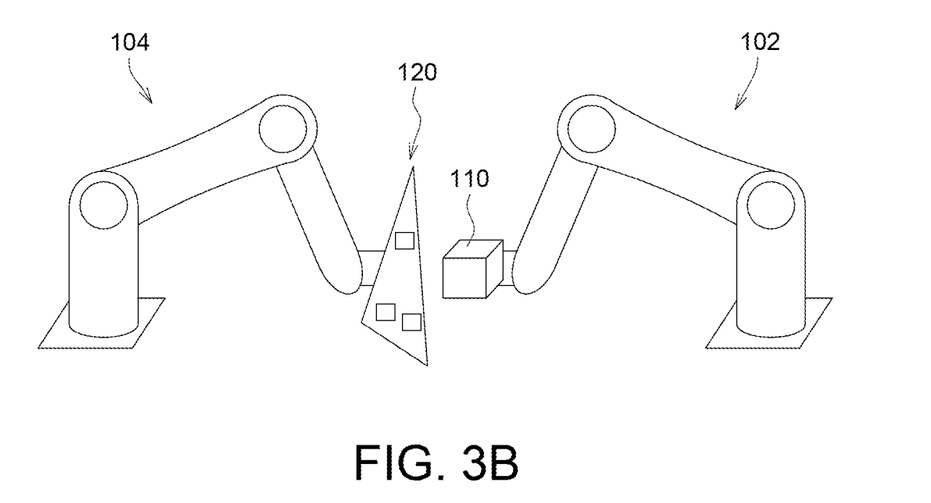
Figure 3C:
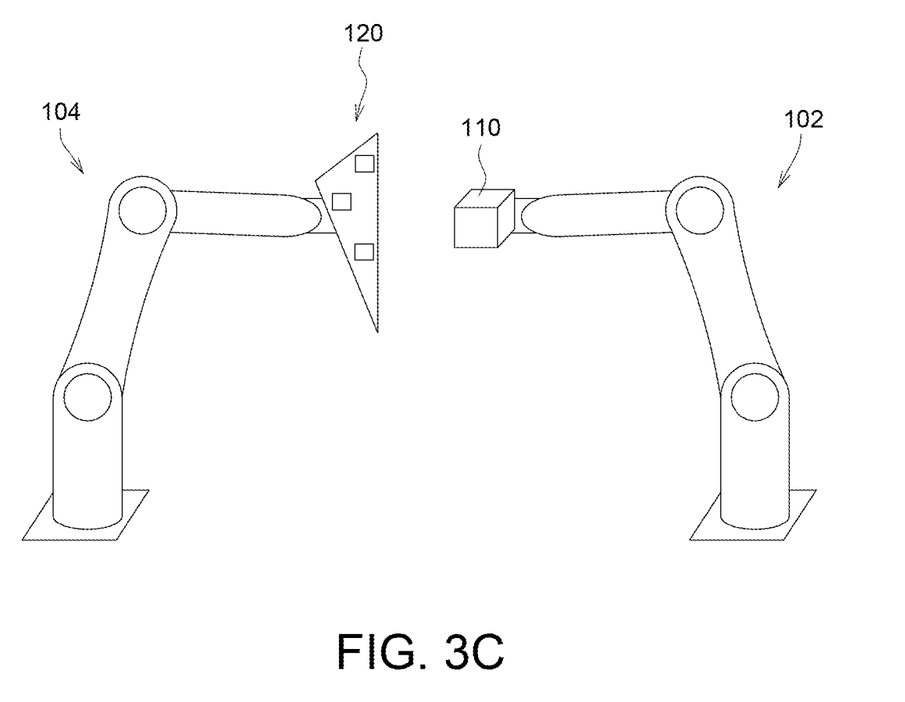

FIG. 1A is a block diagram of a robot arm calibration device 100 according to an embodiment of the disclosure. FIG. 1B is a schematic diagram of arrangement of a robot arm calibration device 100 of FIG. 1A. FIG. 2 shows a flow diagram of a robot arm calibration method 101 according to an embodiment of the disclosure. FIGS. 3A-3C show schematic diagrams of relative movements of two robot arms according to an embodiment of the disclosure, respectively.

Referring to FIGS. 1A and 1B, according to an embodiment of the disclosure, the robot arm calibration device 100 includes a light emitter 110, a light sensing module 120, a cooperative motion controller 130 and a processing module 140. The light emitter 110 is disposed on a robot arm (such as a corrected robot arm 102) to emit a light beam L. The light sensing module is 120 disposed on another robot arm (such as a robot arm 104 to be corrected) to receive the light beam L and convert the light beam L into a plurality of image data M. The cooperative motion controller 130 generates motion commands C1 and C2 for the two robot arms respectively, and drives the light emitter 110 and the light sensing module 120 on the two robot arm to a corrected position and a position to be corrected respectively. The processing module 140 is configured to receive the image data M and the motion parameters $R_A(DH_A,\theta_A)$ and $R_B(DH_B,\theta_B)$ of the two robot arms to calculate an error value between the corrected position and the position to be corrected, and analyzes the image data M to output a corrected motion parameter R. The cooperative motion controller 130 modifies the motion command C2 of the robot arm 104 to be corrected according to the corrected motion parameter R so as to improve the positioning precision for the robot arm 104 to be corrected.

Referring to FIG. 1B, in an embodiment, the light emitter 110 is disposed on the end E1 of the corrected robot arm 102, and the light sensing module 120 is disposed on the end E2 of the robot arm 104 to be corrected. However, the disclosure is not limited thereto. In another embodiment, the light emitter 110 can be disposed on the end E2 of the robot arm 104 to be corrected, and the light sensing module 120 can be disposed on the end E1 of the corrected robot arm 102. The light emitter 110 includes a light-emitting element, such as laser or a light emitting diode (LED) and so on, and the position of the light emitter 110 at the end is a known parameter. The light sensing module 120 includes a plurality of light sensing units 121 and a supporting plate 123, the light sensing units can be two-dimensional image sensors, such as charge coupled device (CCD), complementary metal-oxide-semiconductor (CMOS) image sensor. The light sensing units 121 are disposed on the supporting plate 123, and the coordinates of each light sensing unit 121 in the coordinate system of the supporting plate 123 are known. In addition, the processing module 140 includes a processor (CPU), a memory, and a built-in computer software to analyze the image data.

The light sensing module 120 is configured to receive the light beam L emitted from the light emitter 110 and the projecting image or projecting image point of the light beam L is converted into electronic signals and transmitted through cable or wireless communication to the cooperative motion controller 130. The communication is performed, for example: the light sensing module 120 and the cooperative motion controller 130 are connected through external transmission line; or, the electronic signal is temporarily stored in the memory of the light sensing module 120, an universal serial bus (USB) flash driver is used to connect the USB terminal of the light sensing module 120 to access the electronic signal, and then the electronic signal in the USB flash driver is transmitted to the cooperative motion controller 130; or, the electronic signal is temporarily stored in light sensing module 120 and transmitted to the cooperative motion controller 130 through wireless communication.

Referring to FIGS. 1A and 1B, the cooperative motion controller 130 is electrically connected to the corrected robot arm 102 and the robot arm 104 to be corrected to drive the corrected robot arm 102 and/or the robot arm 104 to be corrected to a preset position, and the corrected robot arm 102 and the robot arm 104 to be corrected are arranged in a designated posture, as shown in FIGS. 3A and 3C.

Referring to FIG. 2, a robot arm calibration method 101 according to an embodiment of the disclosure includes the following steps S11 to S17. Please refer to FIGS. 1A, 1B and 2, in step S11, a cooperative motion controller 130 drives a light emitter 110 and a light sensing module 120 on two robot arms to a corrected position and a position to be corrected according to a motion command, respectively. In step S12, when the two robot arms are in a motion posture K (K=1-N, N is a total number of motion postures), the light emitter 110 and the light sensing module 120 on the two robot arms are held in a relative position (refer to FIG. 3A), and the light emitter 110 emits a light beam L. The light beam L is sequentially projected on each light sensing unit 121 of the light sensing module 120. In addition, in step S12, the two robot arms change to another motion posture, so that the light emitter 110 and the light sensing module 120 on two robot arms are held in another relative position (refer to FIGS. 3B and 3C). Then, the light emitter 110 emits a light beam L again, and the light beam L is sequentially projected onto each light sensing unit 121 of the light sensing module 120.

In step S13, the light sensing module 120 receives the light beam L and converts the light beam L into a plurality of image data for determining whether an offset presents between the corrected position and the position to be corrected. That is, the position of the robot arm 104 to be corrected is adjusted by the image data of the light spot on the light sensing unit 121, so that the position of the robot arm 104 to be corrected can meet the measurement condition. The light sensing unit 121 senses the projection of the light beam L and the image on the pixel of the light sensing unit 121 irradiated by the light beam L is converted into an image data $X_{measure}$. The image data $X_{measure}$ can be a single position point or a set of a plurality of position points, and each point represents the projection position of the light beam L in the coordinate system of the light sensing module 120.

In an embodiment, the coordinate position function of the light beam L projected onto the light sensing unit 121 can be expressed as: $X_{point}=G(R_A(DH_A, \theta_A), H_{A\_emitter}, R_B(DH_B, \theta_B), H_{B\_sensor}, H_{A-B})$, where $R_A(DH_A,\theta_A)$ is a motion parameter of the corrected robot arm 102, $H_{A\_emitter}$ is a relative spatial transform parameter of the end E1 of the corrected robot arm 102 to the light emitter 110, $R_B(DH_B, \theta_B)$ is a motion parameter of the robot arm 104 to be corrected, $H_{B\_sensor}$ is a relative spatial transform parameter of the end E2 of the robot arm 104 to be corrected to the light sensing module 120, $H_{A-B}$ is a relative spatial transform parameter of the corrected robot arm 102 and the robot arm 104 to be corrected. $DH_A$ is a six-axis spatial transform parameter of the corrected robot arm 102, $\theta_A$ are all joint angles of the corrected robot arm 102, $DH_B$ is a six-axis spatial transform parameter of the robot arm 104 to be corrected, and $\theta_B$ are all joint angles of the robot arm 104 to be corrected. In the present disclosure, the motion postures of the two robot arms can be adjusted several times and the light beam L is sequentially projected onto each light sensing unit 121 to obtain a plurality of image data.

Next, in step S14, the cooperative motion controller 130 records the motion command $X_{A\_point\_k}$ of the corrected robot arm 102, the j-th motion command $X_{B\_point\_k\_j}$ of the robot arm 104 to be corrected (j=1-P, where P is the number of the optical sensing units 121) and repeat steps S11 to S13 to obtain the j-th image data of the light sensing module 120 in the motion posture k.

In step S15, the processing module 140 records the image data M in all the motion postures k (k=1-N), that is, the image data M of the light sensing module 120 (the number of the image data M is N times P, and M is greater than or equal to the number of parameters to be corrected), and analyzes whether the spot center position of the image data M is at a predicted projecting position. If the spot center position deviates from the predicted projecting position, it indicates that the motion parameter of the robot arm 104 to be corrected needs to be further adjusted. Next, in step S16, the processing module 140 may calculate a corrected motion parameter according to the motion parameter of the corrected robot arm 102, the motion parameter of the robot arm 104 to be corrected and the corresponding plurality of image data M of the light sensing module 120 in each motion posture.

In an embodiment, the processing module 140 may obtain a correct value according to an error value between the coordinate position of the measured projecting point or projecting pattern in the coordinate system of the light sensing module 120 and the predicted projecting position, and the motion parameter to be corrected can be adjusted by numerical methods, so that the error value can be minimized and approaches zero.

In the embodiment, the motion parameter $R_A$ ($DH_A$, $\theta_A$) of the corrected robot arm 102 is known, and all the joint angles $\theta_A$ of the robot arm 102, all the joint angles $\theta_B$ of the robot arm 104 to be corrected, and the coordinate position $X_{point}$ of the light beam L projected on the light sensing unit 121 have been measured, and six-axis spatial transform parameter $DH_B$ of the robot arm 104 to be corrected is obtained through the optimal algorithm and the relative spatial transform parameter $H_{A-B}$ of the corrected robot arm 102 and the robot arm 104 to be corrected, the relative spatial transform parameter $H_{A\_emitter}$ of the end E1 of the corrected robot arm 102 to the light emitter 110, and the relative spatial transform parameter $H_{B\_sensor}$ of the end E2 of the robot arm 104 to be corrected to the light sensing module 120 can be identified at the same time so as to adjust the motion parameter of the robot arm 104 to be corrected. For example, spatial coordinate of each joint angle or each arm can be adjusted.

Next, in step S17, the processing module 140 outputs the corrected motion parameter to the cooperative motion controller 130, so that the cooperative motion controller 130 modifies a motion command according to the corrected motion parameter to compensate the offset error, so as to improve the absolute position precision of the robot arm 104 to be corrected and reduce the error value. The processing module 140 may transmit the corrected motion parameter to the cooperative motion controller 130 through an external connection line or a wireless communication method. In this way, after receiving the corrected motion parameter, the cooperative motion controller 130 may further modify the motion command of the robot arm 104 to be corrected to complete the calibration procedure.

Figure 4A:
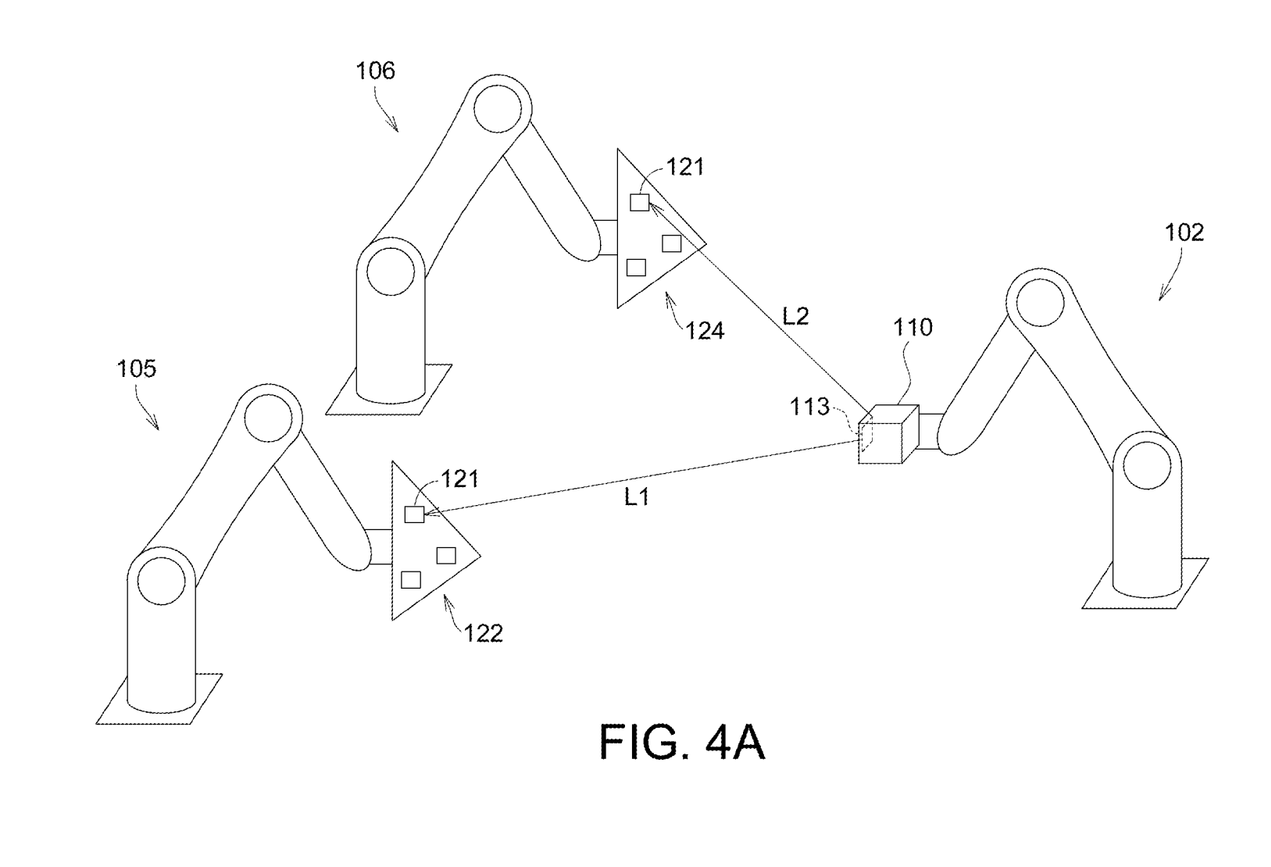
FIGS. 4A and 4B show a schematic diagram of the calibration of two robot arms to be corrected by using a corrected robot arm according to an embodiment of the disclosure, respectively.
Figure 4B:
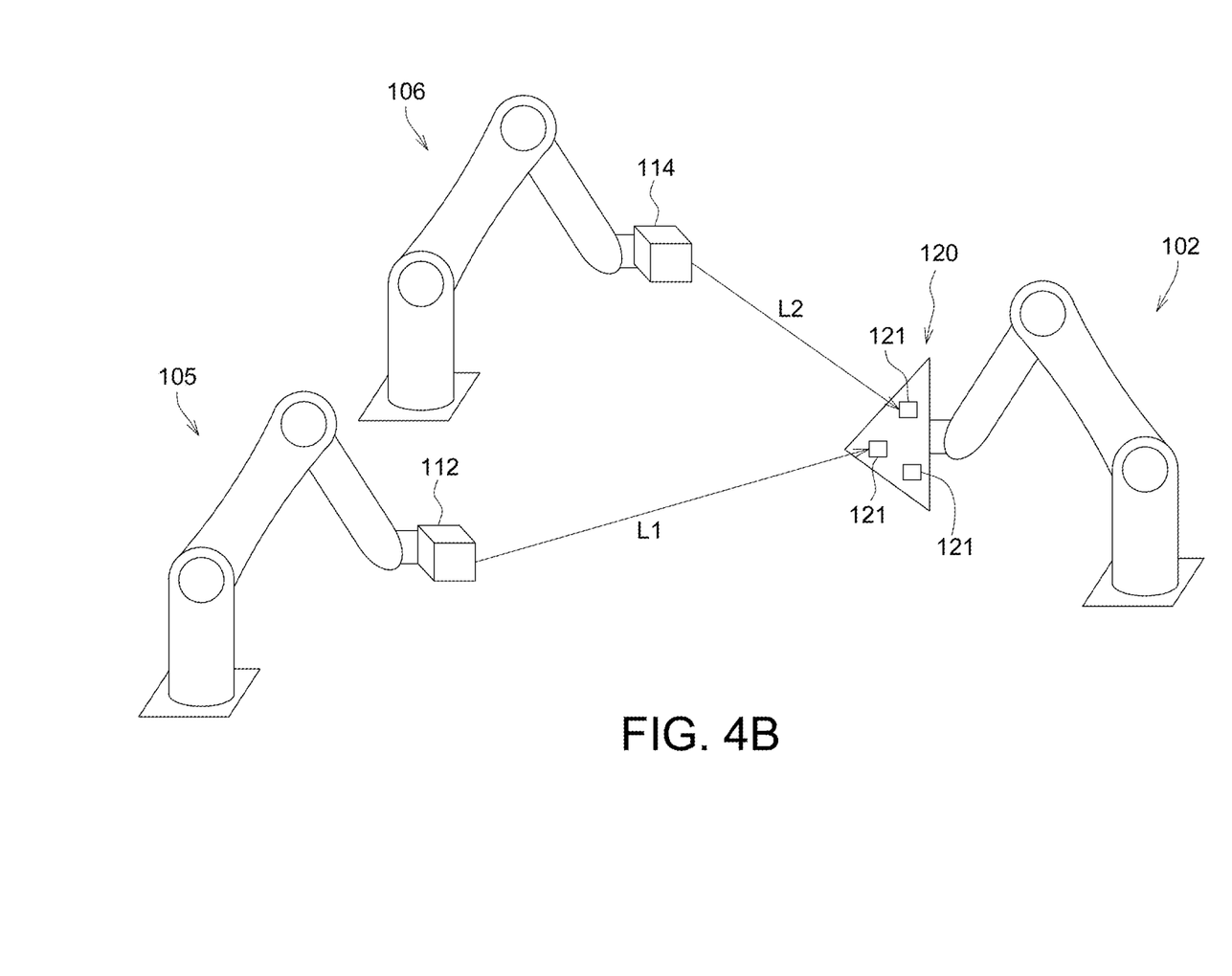

In step S12, in order to ensure that the light sensing module 120 can accurately receive the light beam L emitted from the light emitter 110, an image capturing device 125 may be additionally disposed on the corrected robot arm 102, and the image capturing device 125 captures a pattern mark 126 on the light sensing module 120 to determine whether the light emitter 110 and the light sensing module 120 are held at a relative position, thereby reducing alignment time. The pattern mark 126 may be a clearly identified geometric pattern or a two-dimensional feature pattern. Alternatively, the image capturing device 125 may also capture the feature at the edge of each light sensing unit 121 as an identification feature. In FIG. 1B, an embodiment in which the image capturing device 125 is disposed on the light emitter 110 is illustrated. In another embodiment, when there are a number of light emitters 110, a plurality of image capturing devices 125 may be individually disposed on the light emitters 110 (as shown in FIG. 4B, a first light emitter 112 and a second light emitter 114 will be described in detail later) or one image capturing device 125 is independently disposed at other positions as long as the pattern mark 126 on the light sensing module 120 can be captured. In another embodiment, the image capturing device 125 may be disposed on one of the corrected robot arm 102 and the robot arm 104 to be corrected. It is only required to capture the pattern mark 126 on the light sensing module 120.

In an embodiment, the corrected robot arm 102 and the robot arm 104 to be corrected may have the same or different numbers of joints and arms, and the ends E1 and E2 of the corrected robot arm 102 and the robot arm 104 to be corrected may have the same or different functional components to be assembled, such as drilling, gripping, laser ablation, dispensing, welding and the like. When the corrected robot arm 102 and the robot arm 104 to be corrected have the same number of joints and arms (e.g., the robot arms of same type) and perform the same function, the corrected robot arm 102 can be used to correct the precision of the robot arm 104 to be corrected to ensure that the precision of the robot arm before shipment or in the production line is within the required range. Alternatively, when the corrected robot arm 102 and the robot arm 104 to be corrected have different number of joints and arms (e.g., the robot arms of different types) and perform different functions, for example, when two robot arms perform a task in cooperation, the corrected robot arm 102 can be used to correct the precision of the robot arm 104 to be corrected in the production line directly to ensure that the relative position of the two robot arms is within the required range of precision. Therefore, it can be seen from the above description that the calibration device 100 and the method thereof of the present disclosure can correct the offset error generated when the two robot arms perform cooperative movement.

In the embodiment, in addition to correcting the precision of a single robot arm 104 to be corrected by a single corrected robot arm 102, the precisions of a plurality of robot arms 105 and 106 to be corrected may also be corrected by the single corrected robot arm 102 at the same time. Please refer to FIGS. 4A and 4B, which respectively illustrate the calibrations of the two robot arms 105 and 106 to be corrected with the corrected robot arm 102 according to an embodiment of the present disclosure. In FIG. 4A, the light beam L emitted by the light emitter 110 is split into a first light beam L1 and a second light beam L2 via a beam splitter 113. An included angle is formed between the first light beam L1 and the second light beam L2, and the included angle of the first light beam L1 and the second light beam L2 is a fixed angle during the movement of the robot arms. The light emitter 110 and the beam splitter 113 may be disposed on the corrected robot arm 102, and the first light sensing module 122 may be disposed on the first robot arm 105 to be corrected, and the second light sensing module 124 may be disposed on the second robot arm 106 to be corrected. The first light beam L1 is projected onto a light sensing unit 121 of the first light sensing module 122 to generate a first image data, and the second light beam L2 is projected onto a light sensing unit 121 of a second light sensing module 124 to generate a second image data.

In addition, the difference from the above embodiment is that in FIG. 4B, the first light emitter 112 and the second light emitter 114 respectively emit the first light beam L1 and the second light beam L2, wherein the first light beam L1 is projected onto a light sensing unit 121 of the light sensing module 120 to generate a first image data and the second light beam L2 is projected onto another light sensing unit 121 of the light sensing module 120 to generate a second image data.

In FIG. 4A, according to the description of steps S11 to S17, when the first robot arm 105 to be corrected moves to a position to be corrected and the first light beam L1 is projected onto the first light sensing module 122, the image data of the first light sensing module 122 in all motion postures are recorded, and the processing module 140 calculates a first corrected motion parameter according to the motion parameter of the corrected robot arm 102, the motion parameter of the first robot arm 105 to be corrected and the first image data in each motion posture corresponding to first light beam L1 such that the cooperative motion controller 130 can modify the motion command of the first robot arm 105 to be corrected according to the first corrected motion parameter to reduce the error value. In addition, when the second robot arm 106 to be corrected moves to a position to be corrected and the second light beam L2 is projected onto the second light sensing module 124, the image data of the second light sensing module 124 in all motion postures are recorded, and the processing module 140 calculates a second corrected motion parameter according to the motion parameter of the corrected robot arm 102, the motion parameter of the second robot arm 106 to be corrected and the second image data in each motion posture corresponding to second light beam L2 such that the cooperative motion controller 130 can modify the motion command of the second robot arm 106 to be corrected according to the second corrected motion parameter to reduce the error value.

In the same manner, referring to FIG. 4B, according to the description of steps S11 to S17, when the first robot arm 105 to be corrected moves to a position to be corrected, the first light emitter 112 projects the first light beam L1 onto a light sensing unit 121 and a plurality of first image data corresponding to the first light beam L1 in all motion postures is recorded, and the processing module 140 calculates a first corrected motion parameter according to the motion parameter of the corrected robot arm 102, the motion parameter of the first robot arm 105 to be corrected and the first image data in each motion posture corresponding to first light beam L1 such that the cooperative motion controller 130 can modify the motion command of the first robot arm 105 to be corrected according to the first corrected motion parameter to reduce the error value. In addition, when the second robot arm 106 to be corrected moves to a position to be corrected, the second light emitter 114 projects the second light beam L2 onto another one light sensing unit 121 and a plurality of second image data corresponding to the second light beam L2 in all motion postures is recorded, and the processing module 140 calculates a second corrected motion parameter according to the motion parameter of the corrected robot arm 102, the motion parameter of the second robot arm 106 to be corrected and the second image data in each motion posture corresponding to second light beam L2 such that the cooperative motion controller 130 can modify the motion command of the second robot arm 106 to be corrected according to the second corrected motion parameter to reduce the error value.

Figure 5A:
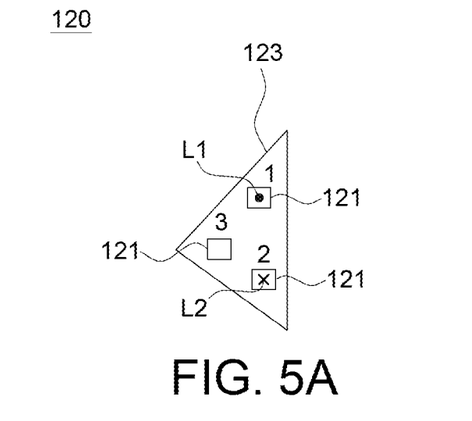
FIGS. 5A to 5C show the schematic diagrams of the first and second light beams projected onto any two light sensing units in FIG. 4B, respectively.
Figure 5B:
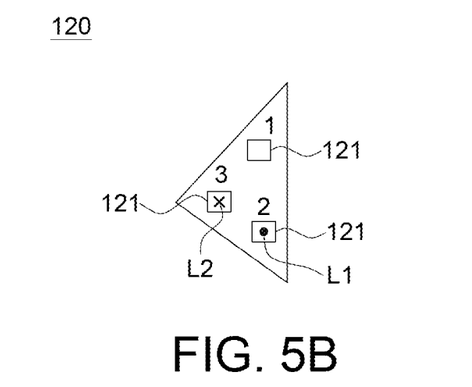
Figure 5C:
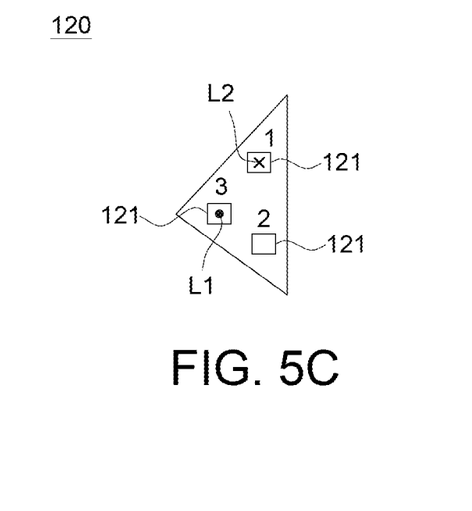

Referring to FIGS. 5A to 5C, schematic diagrams of the first light beam L1 and the second light beam L2 projected on any two light sensing units 121 in FIG. 4B are shown. In an embodiment, the light sensing module 120 has, for example, three light sensing units 121 located on the supporting plate 123, and the light sensing units 121 are separated from each other by a predetermined distance. In FIG. 5A, the first light beam L1 and the second light beam L2 are projected on the light sensing units 121 numbered 1 and 2, respectively. In FIG. 5B, the first light beam L1 and the second light beam L2 are projected on the light sensing units 121 numbered 2 and 3, respectively. In FIG. 5C, the first light beam L1 and the second light beam L2 are projected on the light sensing units 121 numbered 3 and 1, respectively. The patterns of the first light beam L1 and the second light beam L2 projected on the light sensing units 121 may be different patterns with two-dimensional features or geometrical shapes. For example, the projecting pattern of the first light beam L1 is a dot, the projecting pattern of the second light beam L2 is X-shaped. In addition, the order of projection of the first light beam L1 is number 1, number 2, and number 3, and the order of projection of the second light beam L2 is number 2, number 3, and number 1. In this way, the processing module 140 can distinguish the first light beam L1 and the second light beam L2 according to at least the above two embodiments (the projecting patterns or the order of projecting times) so that the first image data corresponding to the first light beam L1 and the second image data corresponding to the second light beam L2 can be distinguished and captured respectively, and the error values of the first robot arm 105 to be corrected and the second robot arm 106 to be corrected are respectively corrected accordingly.

Figure 6A:
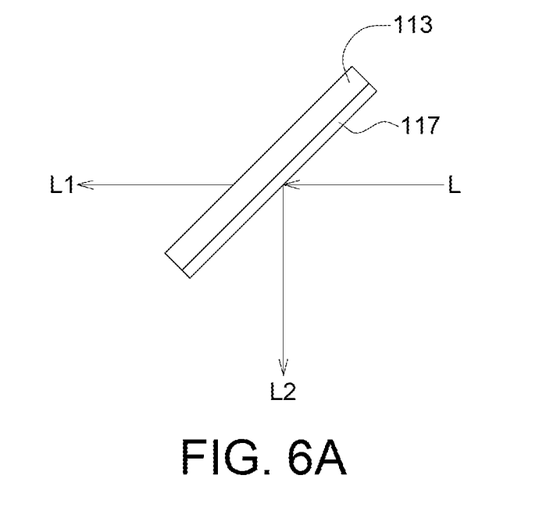
FIG. 6A shows a schematic diagram of the light beam split into two light beams via a beam splitter.
Figure 6B:
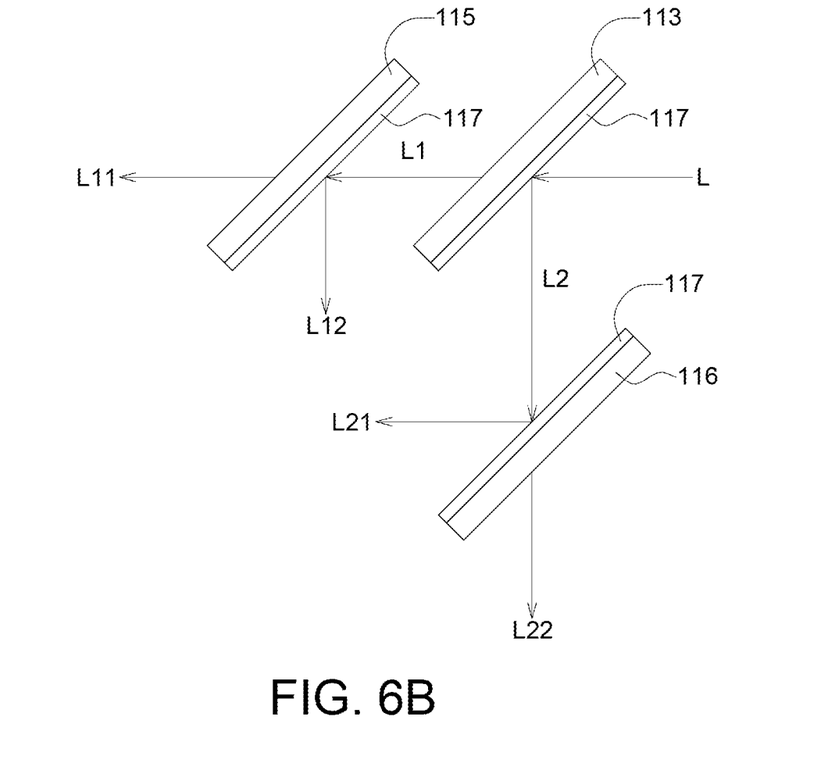
FIG. 6B shows a schematic diagram of the light beam split into four sub-beams via three beam splitters.

Referring to FIG. 6A, the light beam L split into a first light beam L1 and a second light beam L2 via the beam splitter 113 to simultaneously correct two robot arms to be corrected is shown. In addition, referring to FIG. 6B, which shows that after the light beam L is first split into the first light beam L1 and the second light beam L2 via the first light beam splitter 113, the first light beam L1 is further split into a first sub-beam L11 and a second sub-beam L12 via the second light beam splitter 115. The second light beam L2 is further split into a third sub-beam L21 and a fourth sub-beam L22 via the third beam splitter 116 to simultaneously correct four robot arms to be corrected. In the embodiment, the beam splitters 113, 115, and 116 are, for example, half-penetrating and half-reflecting mirrors having a plurality of non-metallic coated films 117, which can make the light beam partially penetrate and partially reflect to form a predetermined number of light beams (greater than or equal to two), but not limited to two or four.

In the robot arm calibration device and the calibration method thereof disclosed in the above embodiments of the present disclosure, the corrected robot arm is provided to correct the precision of the robot arm to be corrected, and the robot arm manufacturer can calibrate the robot arms before shipment. The offset error in precision due to manufacturing or assembly errors can be compensated and the robot user is allowed to regularly calibrate robot arms at the factory to address the problem of maintaining mechanical precision hard due to mechanical offset over long time of use, or the offset error caused by maintenance of the robot arm (such as replacement of a motor). In addition, the calibration device and the method thereof of the present disclosure can meet the need of correcting the absolute precision of a robot arm directly on the production line, and can correct the offset error in precision generated by two robot arms during cooperative movement so as to ensure that the relative position of the two robot arms can be within the required range of precision.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A robot arm calibration device, comprising:
  a light emitter disposed on at least one robot arm to emit a light beam;
  a light sensing module disposed on at least another robot arm to receive the light beam and the light beam being converted into a plurality of image data, wherein the light sensing module comprises a plurality of light sensing units, and the light emitter sequentially projects the light beam onto the light sensing units to generate the plurality of image data;

a cooperative motion controller configured to drive the light emitter and the light sensing module on the at least two robot arms to a corrected position and a position to be corrected respectively; and a processing module for receiving the image data and motion parameters of the at least two robot arms to calculate an error value between the corrected position and the position to be corrected and analyzing the image data to output a corrected motion parameter, wherein the cooperative motion controller modifies a motion command of at least one of the at least two robot arms according to the corrected motion parameter.

2. The calibration device according to claim 1, wherein the at least two robot arms comprises a corrected robot arm and a robot arm to be corrected, when the two robot arms are in a motion posture, the light emitter and the light sensing module on the two robot arms are held in a relative position, and the light emitter emits the light beam so that the light beam sequentially projects onto the light sensing units, when the two robot arms change to another motion posture, the light emitter and the light sensing module on the two robot arms are held in another relative position, and the light emitter emits the light beam again so that the light beam sequentially projects onto the light sensing units.

3. The calibration device according to claim 2, wherein the light emitter and the light sensing module are respectively disposed on the corrected robot and the robot arm to be corrected, and the processing module calculates a corrected motion parameter according to the motion parameter of the corrected robot arm, the motion parameter of the robot arm to be corrected and the image data corresponding to the light beam for the cooperative motion controller to modify the motion command of the robot arm to be corrected according to the corrected motion parameter.

4. The calibration device according to claim 1, wherein the at least two robot arms comprises a corrected robot arm and a plurality of robot arms to be corrected, and the light emitter is disposed on the corrected robot arm, and at least one beam splitter further disposed on the corrected robot arm, wherein the light beam is split into a first light beam and a second light beam via the at least one beam splitter, an included angle formed between the first light beam and the second light beam is a fixed angle, the light sensing module comprises two light sensing modules respectively disposed on two of the robot arms to be corrected, and the first light beam and the second light beam respectively project onto the corresponding two light sensing modules.

5. The calibration device according to claim 4, wherein the at least one beam splitter includes a first beam splitter, a second beam splitter and a third beam splitter, wherein the light beam is split into the first light beam and the second light beam via the first beam splitter, the first light beam is split into a first sub-beam and a second sub-beam via the second beam splitter, and the second light beam is split into a third sub-beam and a fourth sub-beam via the third beam splitter, the light sensing module comprises four light sensing modules respectively disposed on four of the robot arms to be corrected, and the first sub-beam, the second sub-beam, the third sub-beam and the fourth sub-beam respectively project onto the four corresponding light sensing modules.

6. The calibration device according to claim 4, wherein the light sensing module comprises a first light sensing module and a second light sensing module, and the first light sensing module is disposed on a first robot arm of the robot arms to be corrected, the processing module calculates a first corrected motion parameter according to the motion parameter of the corrected robot arm, the motion parameter of the first robot arm to be corrected and the plurality of image data corresponding to the first light beam for the cooperative motion controller to modify the motion command of the first robot arm to be corrected according to the first corrected motion parameter; and wherein the second light sensing module is disposed on a second robot arm of the robot arms to be corrected, the processing module calculates a second corrected motion parameter according to the motion parameter of the corrected robot arm, the motion parameter of the second robot arm to be corrected and the plurality of image data corresponding to the second light beam for the cooperative motion controller to modify the motion command of the second robot arm to be corrected according to the second corrected motion parameter.

7. The calibration device as claimed in claim 1, wherein the at least two robot arms comprise a corrected robot arm and a plurality of robot arms to be corrected, and the light sensing module is disposed on the corrected robot arm, the light emitter comprises a first light emitter and a second light emitter respectively disposed on two of the robot arms to be corrected, the first light emitter and the second light emitter respectively emit a first light beam and a second light beam, the first light beam projects onto one of the light sensing units and the second light beam projects onto another one of the light sensing units.

8. The calibration device according to claim 7, wherein the first light emitter is disposed on a first robot arm of the robot arms to be corrected, and the processing module calculates a first corrected motion parameter according to the motion parameter of the corrected robot arm, the motion parameter of the first robot arm to be corrected and the plurality of image data corresponding to the first light beam for the cooperative motion controller to modify the motion command of the first robot arm to be corrected according to the first corrected motion parameter; and wherein the second emitter is disposed on a second robot arm of the robot arms to be corrected, the processing module calculates a second corrected motion parameter according to the motion parameter of the corrected robot arm, the motion parameter of the second robot arm to be corrected and the plurality of image data corresponding to the second light beam for the cooperative motion controller to modify the motion command of the second robot arm to be corrected according to the second corrected motion parameter.

9. The calibration device according to claim 1, further comprising an image capturing device for capturing a pattern mark on the light sensing module, wherein the image capturing device identifies the pattern mark to determine a relative position of the light emitter and the light sensing module.

10. The calibration device according to claim 4, further comprising an image capturing device for capturing a pattern mark on the light sensing module, wherein the image capturing device identifies the pattern mark to determine a relative position of the light emitter and the light sensing module.

11. The calibration device according to claim 7, further comprising an image capturing device for capturing a pattern mark on the light sensing module, wherein the image capturing device identifies the pattern mark to determine a relative position of the light emitter and the light sensing module.

12. A robot arm calibrating method, comprising:
disposing a light emitter and a light sensing module on at least two robot arms respectively;
driving the light emitter and the light sensing module on the at least two robot arms to a corrected position and a position to be corrected respectively;
emitting a light beam by the light emitter to project the light beam onto the light sensing module;
receiving the light beam by the light sensing module and converting the light beam into a plurality of image data, wherein the light sensing module comprises a plurality of light sensing units, and the light emitter sequentially projects the light beam onto the light sensing units respectively to generate the plurality of image data;
calculating an error value between the corrected position and the position to be corrected according to the plurality of image data and the motion parameters of the at least two robot arms and analyzing the plurality of image data to output a corrected motion parameter; and
modifying a motion command of at least one of the at least two robot arms according to the corrected motion parameter.

13. The calibration method according to claim 12, wherein the at least two robot arms comprises a corrected robot arm and a robot arm to be corrected, when the two robot arms are in a motion posture, the light emitter and the light sensing module on the two robot arms are held in a relative position, and the light emitter emits the light beam so that the light beam sequentially projects onto the light sensing units, when the two robot arms change to another motion posture, the light emitter and the light sensing module on the two robot arms are held in another relative position, and the light emitter emits the light beam again so that the light beam sequentially projects onto the light sensing units.

14. The calibration method according to claim 13, wherein the light emitter and the light sensing module are respectively disposed on the corrected robot and the robot arm to be corrected, and the calibration method is performed by calculating the corrected motion parameter according to the motion parameter of the corrected robot arm, the motion parameter of the robot arm to be corrected and the image data corresponding to the light beam to modify the motion command of the robot arm to be corrected according to the corrected motion parameter.

15. The calibration method according to claim 12, wherein the at least two robot arms comprises a corrected robot arm and a plurality of robot arms to be corrected, and the light emitter is disposed on the corrected robot arm, and at least one beam splitter further disposed on the corrected robot arm, wherein the light beam is split into a first light beam and a second light beam via the at least one beam splitter, an included angle formed between the first light beam and the second light beam is a fixed angle, the light sensing module comprises two light sensing modules respectively disposed on two of the robot arms to be corrected, and the first light beam and the second light beam respectively project onto the corresponding two light sensing modules.

16. The calibration method according to claim 15, wherein the at least one beam splitter includes a first beam splitter, a second beam splitter and a third beam splitter, wherein the light beam is split into the first light beam and the second light beam via the first beam splitter, the first light beam is split into a first sub-beam and a second sub-beam via the second beam splitter, and the second light beam is split into a third sub-beam and a fourth sub-beam via the third beam splitter, the light sensing module comprises four light sensing modules respectively disposed on four of the robot arms to be corrected, and the first sub-beam, the second sub-beam, the third sub-beam and the fourth sub-beam respectively project onto the four corresponding light sensing modules.

17. The calibration method according to claim 15, wherein the light sensing module comprises a first light sensing module and a second light sensing module, and the first light sensing module is disposed on a first robot arm of the robot arms to be corrected, the calibration method is performed by calculating a first corrected motion parameter according to the motion parameter of the corrected robot arm, the motion parameter of the first robot arm to be corrected and the plurality of image data corresponding to the first light beam to modify the motion command of the first robot arm to be corrected according to the first corrected motion parameter; and
wherein the second light sensing module is disposed on a second robot arm of the robot arms to be corrected, the calibration method is performed by calculating a second corrected motion parameter according to the motion parameter of the corrected robot arm, the motion parameter of the second robot arm to be corrected and the plurality of image data corresponding to the second light beam to modify the motion command of the second robot arm to be corrected according to the second corrected motion parameter.

18. The calibration method according to claim 12, wherein the at least two robot arms comprise a corrected robot arm and a plurality of robot arms to be corrected, and the light sensing module is disposed on the corrected robot arm, the light emitter comprises a first light emitter and a second light emitter respectively disposed on two of the robot arms to be corrected, the first light emitter and the second light emitter respectively emit a first light beam and a second light beam, the first light beam projects onto one of the light sensing units and the second light beam projects onto another one of the light sensing units.

19. The calibration method according to claim 18, wherein the first light emitter is disposed on a first robot arm of the robot arms to be corrected, and the calibration method is performed by calculating a first corrected motion parameter according to the motion parameter of the corrected robot arm, the motion parameter of the first robot arm to be corrected and the plurality of image data corresponding to the first light beam to modify the motion command of the first robot arm to be corrected according to the first corrected motion parameter; and
wherein the second emitter is disposed on a second robot arm of the robot arms to be corrected, the calibration method is performed by calculating a second corrected motion parameter according to the motion parameter of the corrected robot arm, the motion parameter of the second robot arm to be corrected and the plurality of image data corresponding to the second light beam to modify the motion command of the second robot arm to be corrected according to the second corrected motion parameter.

20. The calibration method according to claim 12, further comprising capturing a pattern mark on the light sensing module by an image capturing device, wherein the image capturing device identifies the pattern mark to determine a relative position of the light emitter and the light sensing module.

21. The calibration method according to claim 15, further comprising capturing a pattern mark on the light sensing module by an image capturing device, wherein the image capturing device identifies the pattern mark to determine a relative position of the light emitter and the light sensing module.

22. The calibration method according to claim 18, further comprising capturing a pattern mark on the light sensing module by an image capturing device, wherein the image capturing device identifies the pattern mark to determine a relative position of the light emitter and the light sensing module.

* * * * *